United States Patent

[11] 3,524,455

| [72] | Inventors | Paul A. Hoogesteger<br>Penfield, New York;<br>Charles R. Mc Dougal, Irondequoit, New York |
|---|---|---|
| [21] | Appl. No. | 856,913 |
| [22] | Filed | Sept. 8, 1969<br>Continuation of Ser. No. 679,909, filed Nov. 1, 1967. |
| [45] | Patented | Aug. 18, 1970 |
| [73] | Assignee | Bausch & Lomb Incorporated<br>Rochester, New York<br>a Corp. of New York |

[54] CONTACT LENS STORAGE CASE
1 Claim, 4 Drawing Figs.

[52] U.S. Cl............................................. 134/143, 206/5
[51] Int. Cl............................................. B08b 11/02
[50] Field of Search........................................ 134/137, 143, 117, 156, 166; 206/5A

[56] References Cited
UNITED STATES PATENTS

| 3,025,950 | 3/1962 | Nathan............................ | 206/5 |
| 3,035,589 | 5/1962 | King................................ | 134/137 |
| 3,070,105 | 12/1962 | Brown............................. | 134/156 |
| 3,101,087 | 8/1963 | Watson............................ | 134/143 |
| 3,268,068 | 8/1966 | Le Grand....................... | 206/5 |
| 3,298,502 | 1/1967 | Schwartzman................. | 206/5 |
| 3,343,657 | 9/1967 | Speshyock..................... | 206/5 |
| 3,344,461 | 10/1967 | Floor............................... | 206/5XR |

*Primary Examiner*— Robert L. Bleutge
*Attorney*— Frank C. Parker

ABSTRACT: An improved contact lens storage case of the type wherein there is provided, lens supporting structure for maintaining the lenses in a generally sphero-convex shape and in contact with a hydrating fluid.

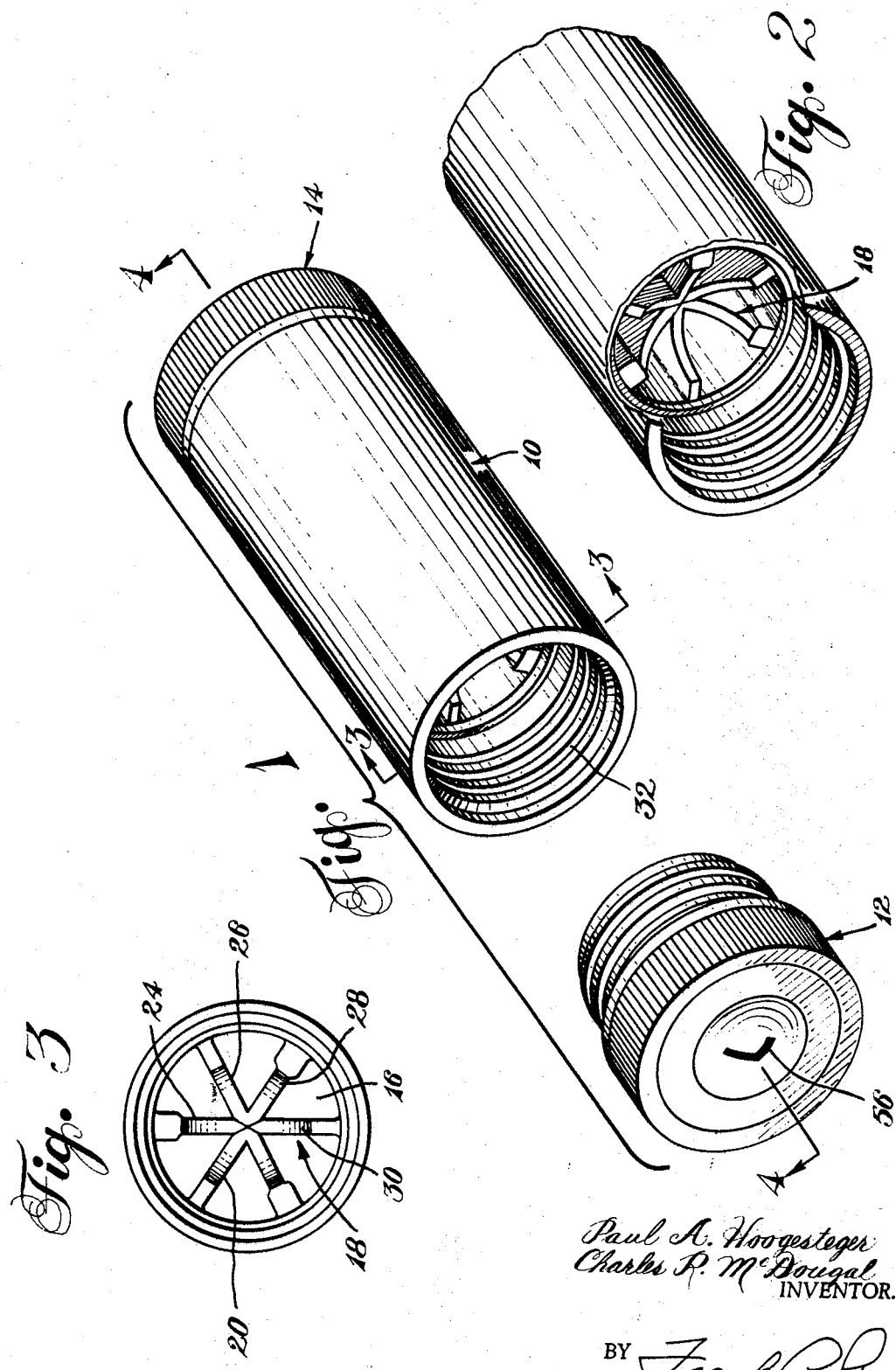

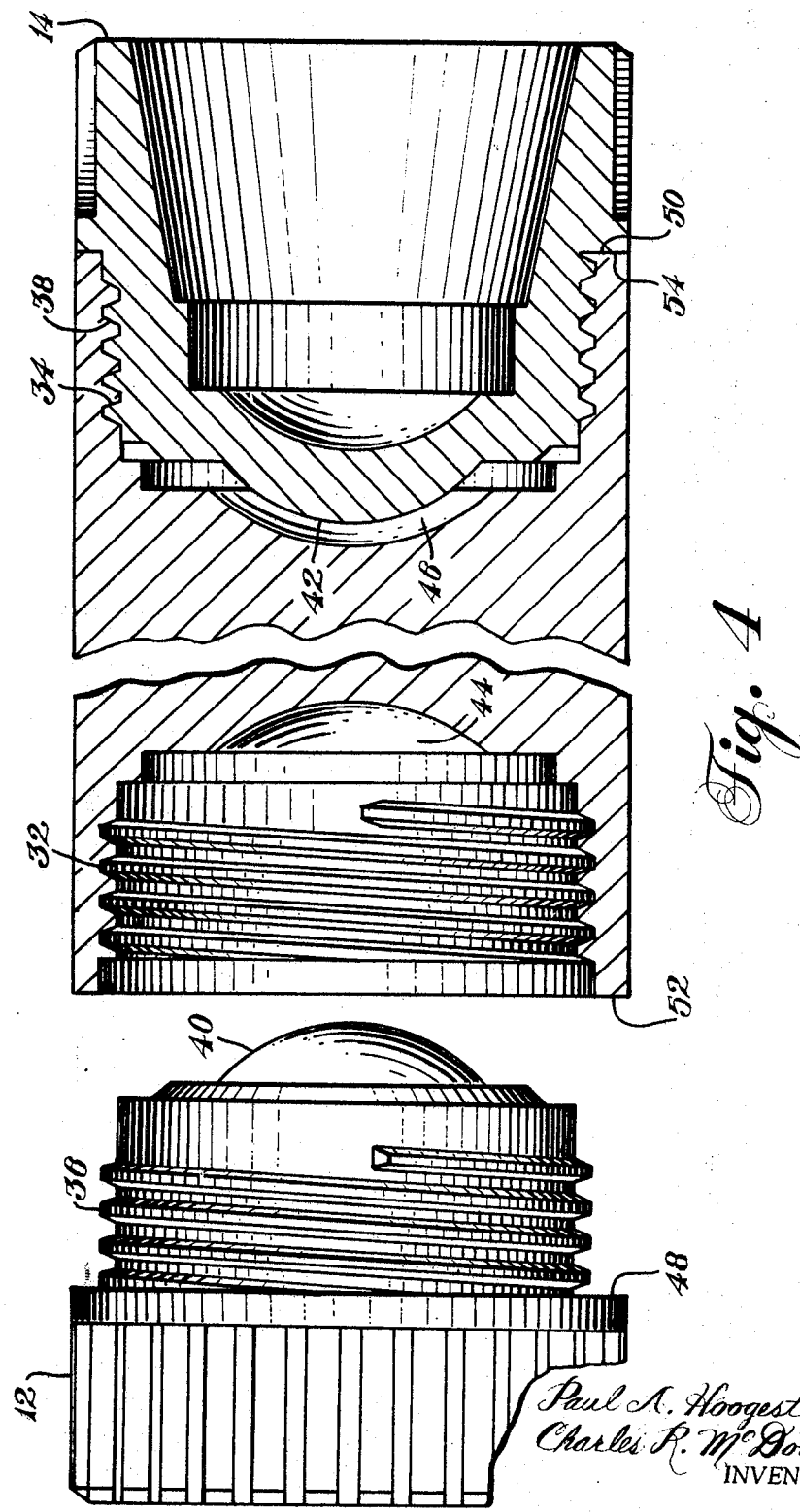

CONTACT LENS STORAGE CASE

CROSS-REFERENCES TO RELATED APPLICATIONS

This application is a continuation of application Serial No. 679,909, filed on November 1, 1967 and now abandoned.

BACKGROUND OF THE INVENTION

This invention relates to an improved case for storing contact lenses.

In prior art contact lens storage cases such as shown by U.S. patent 3,070,105 granted to F. E. Brown, there is provided a means for storing a contact lens with the concave side in the upward position. This method has one serious drawback in that when the lens is extracted from the case, the finger of the wearer or other extracting device of necessity must come in contact with the surface of the contact lens that is to be in contact with the eye of the wearer. This makes it possible for the surface of the contact lens to become scratched, damaged, or come in contact with other foreign matter. Furthermore, in prior art contact lens storage cases the lenses were rigidly fixed between sponge-like members or allowed to float free in a hydrating solution.

SUMMARY OF THE INVENTION

To avoid the above described problems, and, to more generally, provide an improved means for storing contact lenses we have devised an improved case wherein the lens is stored by maintaining its sphero-convex shape.

The present invention provides a case of generally cylindrical shape with end caps containing sphero-convex protrusions for holding the contact lenses by adhering the lenses thereto. A further feature of the invention resides in a central fluid storage cavity and means for contacting the fluid with the stored lenses.

This case is particularly adaptable to storage of contact lenses manufactured from Cross-Linked Hydrophilic Polymers as disclosed in U.S. Patent 3,220,960 granted to O. Wichterle. Contact lenses made from this material absorb water and in so doing become soft without loss of optical properties. These soft lenses are more comfortable to the wearer in that there is no hard surface in contact with the surface of the eye. When not in use such soft lenses must be kept in contact with a hydrating fluid in order to remain soft. Furthermore, since the soft lenses are pliable they must be stored in such a manner that they can be easily removed from the case without use of clamping or pinching devices.

Accordingly it is the primary object of the present invention to store the lenses in such a manner so as to avoid damage to the inner surface of the lens.

Another object of the present invention is to provide a contact lens storage case whereby the lens is inserted and removed from the case by the same procedure as is used to insert and remove the lens from the eye of the wearer.

It is another object of the present invention to provide a means for storing a contact lens and maintaining its generally sphero convex shape.

It is a further object of this invention to provide a contact lens storage case wherein the lenses are stored in contact with a hydrating fluid.

It is still another object of the present invention to provide a storage case for contact lenses made from cross-linked hydrophilic polymers.

BRIEF DESCRIPTION OF THE DRAWINGS

FIGURE 1 is a partially exploded view of the case according to the present invention.

FIGURE 2 is a perspective view partially broken away of the central case portion.

FIGURE 3 is a view taken in the direction as suggested by 3-3 of FIG. 1.

FIGURE 4 is a section taken along line 4-4 of FIGURE 1.

DESCRIPTION OF THE PREFERRED EMBODIMENTS

Referring now to FIGURE 1, there is shown a contact lens storage case according to the present invention comprising a body portion generally designated as numeral 10 and end caps designated as 12 and 14. The body portion of the case contains a central aperture 16 into which is placed the lens supporting structure generally designated as 18. The lens supporting structure 18 contains a plurality of ribs 20, 22, 24, 26, 28, 30 and the ends of the supporting structure are in sphero-concave shape as shown in FIGURE 2 and FIGURE 4. The ends of the case contain internally threaded extensions 32-34 to receive the threaded portions 36-38 of the end caps 12-14. The end caps 12-14 contain depending sphero-convex surfaces 40-42 adaptable to receive the contact lens and adhere the lens thereto. The caps 12-14 are also provided with suitable knurling on the end portions thereof for ease in gripping.

Referring now to FIGURE 4, it can be seen that when the end caps are inserted into the case there is defined spherical storage cavities 44-46 for maintaining the lens in its spherical shape.

The threaded portions of both the end caps 12-14 and the body of the case 10 are made to close tolerances to prevent water seepage out of the case. In addition surfaces 48-50 of end caps 12-14 and surfaces 52-54 of body section 10, are made to close parallel tolerances to further aid in maintaining a fluid seal. The end caps may also be designated with a letter, as shown in FIGURE 1 as numeral 56, for designating the left and right lens.

In use one cap is affixed to the storage case and the case is held in a vertical position with the open end up and filled with fluid. One contact lens may then be affixed to the removed end cap on surface 40 or 42 and the loose cap affixed into the body portion. The case may then be inverted and the other end cap removed and the remaining lens affixed to the spherical surface. The cap is then affixed to the body portion of the case forming a fluid seal with the case. The lenses then may be stored by maintaining the case in virtually any position and the lenses will be supported in a generally spherical configuration and be in continuous contact with the hydrating fluid.

The shape of the case as shown in the accompanying drawings is not determined critical. Any particular shape that provides positive fluid sealing means in conjunction with the spherical mounting means for the lenses may be used.

In addition sealing means may be accomplished by making surfaces 48 and 50 in conical shape and corresponding surfaces 52-54 in mating conical configuration. Furthermore, these conical surfaces can be provided with well-known O-ring sealing means. In addition, the embodiment as shown in the accompanying drawings can be provided with flat rubber washers on surfaces 48-50 of the caps 12-14. It is also possible to put a small groove into these surfaces 48-50 and dispose therein a suitable O-ring.

It may also be desirable to provide a lug or other ring securing means to the case for attaching the case to a chain or attaching the caps by means of flexible leaders to the case.

It is thought desirable to fabricate the entire storage case from a plastic material such as white polypropylene. However, any material can be used for the case that will provide ease in fabrication and allow the lenses to adhere to the sphero convex surfaces provided in the end caps.

Although only certain forms of the present invention are shown and described herein in detail, other forms are possible and changes may be made without departing from the spirit and scope of the invention as defined in the following claim.

I claim:

1. A storage case for hydrophilic contact lenses for minimizing distortion of the hydrophilic contact lenses resulting from the contact lenses not being held in their proper shapes comprising a container and removable end caps for each end of the container, said container and end caps defining a fluid-tight cavity when said end caps are affixed to said container, said container having a central fluid storage cavity containing a fluid, said fluid storage cavity having a plurality of longitudinally extending ribs, the ends of said ribs extending transversely across the entire fluid storage cavity and defining ribbed sphero-concave lens supports, said removable end caps including generally sphero-convex lens supports, said sphero-concave lens supports of said storage cavity and said sphero-convex end cap lens supports defining generally hemispherical storage cavities whereby the contact lenses are supported in said hemispherical storage cavities to maintain their shape and maintain them in continuous contact with the fluid when said end caps are affixed to said container.